US012142413B2

(12) United States Patent
Oishi et al.

(10) Patent No.: US 12,142,413 B2
(45) Date of Patent: Nov. 12, 2024

(54) COIL COMPONENT AND MANUFACTURING METHOD OF SAME

(71) Applicant: Murata Manufacturing Co., Ltd., Kyoto-fu (JP)

(72) Inventors: Masayuki Oishi, Nagaokakyo (JP); Mitsuru Odahara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 519 days.

(21) Appl. No.: 17/491,262

(22) Filed: Sep. 30, 2021

(65) Prior Publication Data

US 2022/0108827 A1 Apr. 7, 2022

(30) Foreign Application Priority Data

Oct. 1, 2020 (JP) ................................ 2020-167098

(51) Int. Cl.

*H01F 27/28* (2006.01)
*H01F 27/29* (2006.01)
*H01F 41/04* (2006.01)

(52) U.S. Cl.

CPC ......... *H01F 27/2804* (2013.01); *H01F 27/29* (2013.01); *H01F 41/041* (2013.01); *H01F 2027/2809* (2013.01)

(58) Field of Classification Search

CPC .... H01F 27/2804; H01F 27/29; H01F 41/041; H01F 2027/2809; H01F 41/046; H01F 17/0013

USPC ........................................ 336/200, 232, 198

See application file for complete search history.

(56) References Cited

U.S. PATENT DOCUMENTS

| | | | | |
|---|---|---|---|---|
| 2002/0109571 | A1* | 8/2002 | Fujiwara | H01F 3/10 336/178 |
| 2010/0033286 | A1* | 2/2010 | Katayama | H01F 3/14 336/200 |
| 2013/0154785 | A1* | 6/2013 | Yokoyama | H01F 41/046 336/200 |
| 2018/0374636 | A1* | 12/2018 | Itani | H01F 27/24 |
| 2019/0172627 | A1* | 6/2019 | Oishi | H01F 17/0013 |
| 2019/0214188 | A1* | 7/2019 | Imada | H01F 27/24 |

FOREIGN PATENT DOCUMENTS

| | | | |
|---|---|---|---|
| CN | 109119241 | A | 1/2019 |
| JP | H08-148363 | A | 6/1996 |
| JP | H11-219821 | A | 8/1999 |
| JP | 2013-125819 | A | 6/2013 |
| JP | 2014-082280 | A | 5/2014 |
| JP | 2014-116396 | A | 6/2014 |
| WO | 2008/004633 | A1 | 1/2008 |
| WO | 2013/035515 | A1 | 3/2013 |

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

A coil component that can mitigate stress generated between a coil wire and a magnetic layer and make a position of a coil stable, and a manufacturing method of the coil component. The coil component includes a base body and a coil disposed in the base body, the base body includes a plurality of magnetic layers laminated in a first direction, the coil includes a plurality of coil wires laminated in the first direction, the base body further includes a crack generating layer that overlaps at least a part of the coil wires when viewed in the first direction, and a crack is present inside the crack generating layer.

16 Claims, 10 Drawing Sheets

COIL COMPONENT AND MANUFACTURING METHOD OF SAME

CROSS-REFERENCE TO RELATED APPLICATION

This application claims benefit of priority to Japanese Patent Application No. 2020-167098 filed Oct. 1, 2020, the entire content of which is incorporated herein by reference.

BACKGROUND

Technical Field

The present disclosure relates to a coil component and a manufacturing method of the same.

Background Art

Japanese Patent Application Laid-Open No. 11-219821 discloses a conventional coil component. This coil component includes a laminate and a coil disposed in the laminate. The laminate includes a plurality of laminated magnetic layers, and the coil includes a plurality of laminated conductor layers. A cavity portion is disposed between the magnetic layer and the conductor layer to cause the magnetic layer and the conductor layer to be not in contact with each other, thereby mitigating stress generated between the magnetic layer and the conductor layer.

SUMMARY

In a conventional coil component, since the cavity portion is provided to all of a periphery of the conductor layer, the conductor layer is not brought into direct contact with the magnetic layer so that there is a fear in which a position of the conductor layer, that is, a position of the coil is made unstable.

Therefore, the present disclosure provides a coil component that can mitigate stress generated between a coil wire and a magnetic layer, and make a position of a coil stable, and a manufacturing method of the same.

A coil component according to the present disclosure includes a base body; and a coil disposed in the base body. The base body includes a plurality of magnetic layers laminated in a first direction. The coil includes a plurality of coil wires laminated in the first direction. The base body further includes a crack generating layer that overlaps at least a part of the coil wires when viewed in the first direction, and a crack is present inside the crack generating layer.

According to the coil component of the present disclosure, the crack is present inside the crack generating layer, whereby stress generated between each of the coil wires and each of the magnetic layers can be mitigated. Further, each of the coil wires is laminated on each of the magnetic layers or the crack generating layer, whereby a position of each of the coil wires, that is, a position of the coil is made stable.

According to one exemplary embodiment of the coil component, the crack generating layer is present between each of the magnetic layers and each of the coil wires adjacent to each other in the first direction.

According to the exemplary embodiment, although strong stress is generated at a border region between each of the magnetic layers and each of the coil wires adjacent to each other in the first direction, provision of the crack generating layer at the border region allows the stress to be effectively mitigated.

According to one exemplary embodiment of the coil component, the crack generating layer is present between two coil wires adjacent to each other in the first direction.

According to the exemplary embodiment, stress generated between two coil wires adjacent to each other in the first direction can be effectively mitigated.

According to one exemplary embodiment of the coil component, the crack generating layer is present between two magnetic layers adjacent to each other in the first direction.

According to the exemplary embodiment, the crack generating layer can be easily disposed in comparison with a case where the crack generating layer is directly disposed to the coil wire.

According to one exemplary embodiment of the coil component, the crack generating layer is further present between each of the magnetic layers and each of the coil wires adjacent to each other in a direction orthogonal to the first direction.

According to the exemplary embodiment, stress in the direction orthogonal to the first direction can be mitigated.

According to one exemplary embodiment of the coil component, the coil wires extend along a plane orthogonal to the first direction, each of the coil wires includes two side surfaces on both sides in the direction orthogonal to the first direction, in a section orthogonal to the extending direction of the coil wires, and the crack generating layer is present between each of the magnetic layers and the side surfaces of each of the coil wires.

According to the exemplary embodiment, stress generated between each of the magnetic layers and side surfaces of each of the coil wires can be mitigated.

According to one exemplary embodiment of the coil component, an average thickness of the crack generating layer is less than or equal to 10 μm.

The average thickness of the crack generating layer is an average thickness of the crack generating layer in a section orthogonal to the extending direction of the coil wires.

According to the exemplary embodiment, since the crack generating layer is thin, when the crack generating layer does not have magnetic properties, a good characteristic (a high inductance value or a high impedance value) as the coil component can be obtained.

According to one exemplary embodiment of the coil component, the crack generating layer includes glass having low tenacity. Here, the term "low tenacity" means "the low tenacity indicating low viscosity of a material", "a state of being fragile against external force, in other words, quick development of a crack, low ultimate strength, and low plasticity and low ductility".

According to the exemplary embodiment, the crack can reliably be generated in the crack generating layer.

According to one exemplary embodiment of the coil component, magnetic permeability of the crack generating layer is larger than 1.

According to the exemplary embodiment, a good characteristic (a high inductance value or a high impedance value) as the coil component can be obtained.

According to one exemplary embodiment of the coil component, magnetic permeability of the crack generating layer is equal to or lower than magnetic permeability of the magnetic layers.

According to the exemplary embodiment, a desired characteristic as the coil component can be obtained.

One exemplary embodiment of a manufacturing method of a coil component includes a preparation step of preparing a green magnetic layer, a green crack generating layer, and a green coil wire; and a lamination step of laminating the green magnetic layer, the green crack generating layer, and the green coil wire in a first direction, and causing the green crack generating layer to overlap at least a part of the green coil wire when viewed in the first direction. The manufacturing method further includes a firing step of firing the green magnetic layer, the green crack generating layer, and the green coil wire to obtain a base body including a magnetic layer and a crack generating layer that overlaps at least a part of a coil wire when viewed in the first direction, and to obtain a coil that is disposed inside the base body and includes the coil wire; and a crack generating step of generating a crack inside the crack generating layer.

The green magnetic layer is formed from a magnetic sheet or a magnetic paste, for example. The green coil wire is formed from a conductive paste, for example. The green crack generating layer is formed from a conductive paste including glass, for example.

According to the exemplary embodiment, since the crack is generated inside the crack generating layer, stress generated between the coil wire and the magnetic layer can be mitigated. Further, each of the coil wires is laminated on each of the magnetic layers or the crack generating layer, whereby a position of each of the coil wires, that is, a position of the coil is made stable.

Further, in one exemplary embodiment of the manufacturing method of the coil component, the crack generating step is a step of performing, on the base body, thermal shock processing having a difference in temperature of 120° C. or more, one or more times.

According to the exemplary embodiment, the crack can reliably be generated inside the crack generating layer.

In one exemplary embodiment of the manufacturing method of the coil component, the thermal shock processing is processing in which the base body is immersed in liquid nitrogen one or more times.

According to the exemplary embodiment, the crack can be generated inside the crack generating layer with a simple method that is immersion.

One exemplary embodiment of a manufacturing method of a coil component includes a preparation step of preparing a green magnetic layer, a green crack generating layer, and a green coil wire; and a lamination step of laminating the green magnetic layer, the green crack generating layer, and the green coil wire in a first direction, and causing the green crack generating layer to overlap at least a part of the green coil wire when viewed in the first direction. The manufacturing method further includes a firing step of firing the green magnetic layer, the green crack generating layer, and the green coil wire to obtain a base body including a magnetic layer and a crack generating layer that overlaps at least a part of a coil wire when viewed in the first direction, and to obtain a coil that is disposed inside the base body and includes a coil wire. The firing step further includes a step of performing thermal shock processing of atmosphere releasing when a firing temperature becomes 300° C. to generate a crack inside the crack generating layer.

The green magnetic layer is formed from a magnetic sheet or a magnetic paste, for example. The green coil wire is formed from a conductive paste, for example. The green crack generating layer is formed from a conductive paste including glass, for example.

According to the exemplary embodiment, since the crack is generated inside the crack generating layer, stress generated between the coil wire and the magnetic layer can be mitigated. Further, each of the coil wires is laminated on each of the magnetic layers or the crack generating layer, whereby a position of each of the coil wires, that is, a position of the coil is made stable.

According to a coil component and a manufacturing method of the coil component, stress generated between a coil wire and a magnetic layer can be mitigated, and a position of a coil can be made stable.

DETAILED DESCRIPTION

Hereinafter, a coil component and a manufacturing method of the coil component according to one aspect of the present disclosure will be described in detail by illustrated exemplary embodiments. Note that the drawings include some schematic drawings, and they sometimes do not reflect actual dimensions or ratios.

First Exemplary Embodiment

Figure 1:
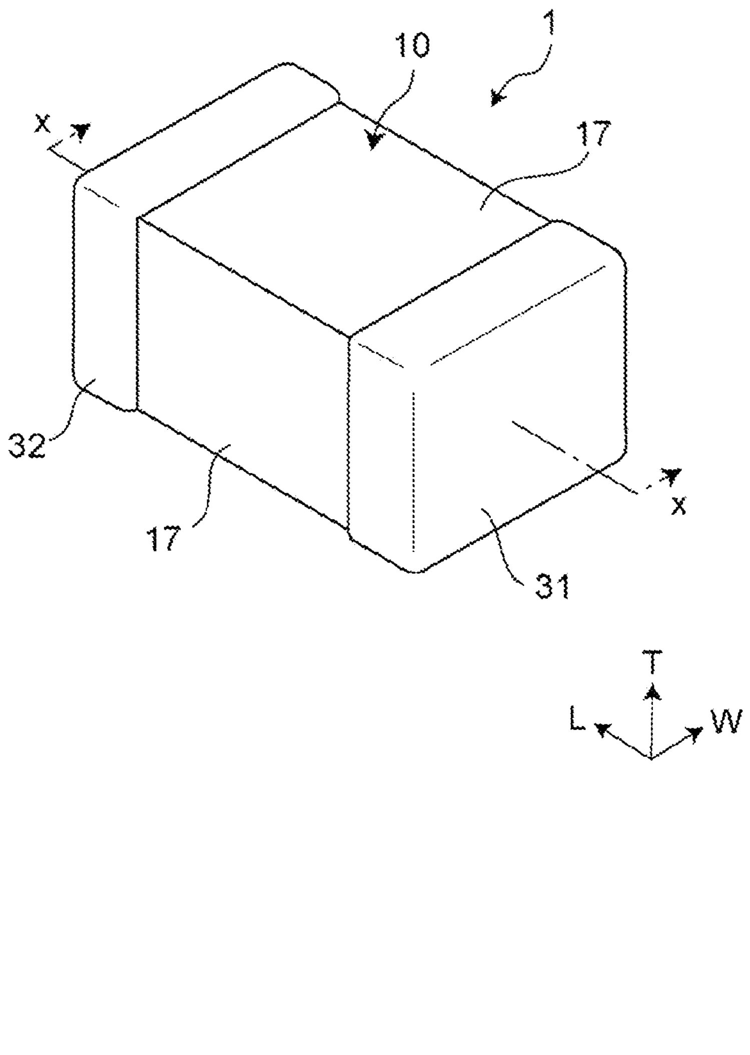
FIG. 1 is a perspective view illustrating a first exemplary embodiment of a coil component of the present disclosure.
Figure 2:
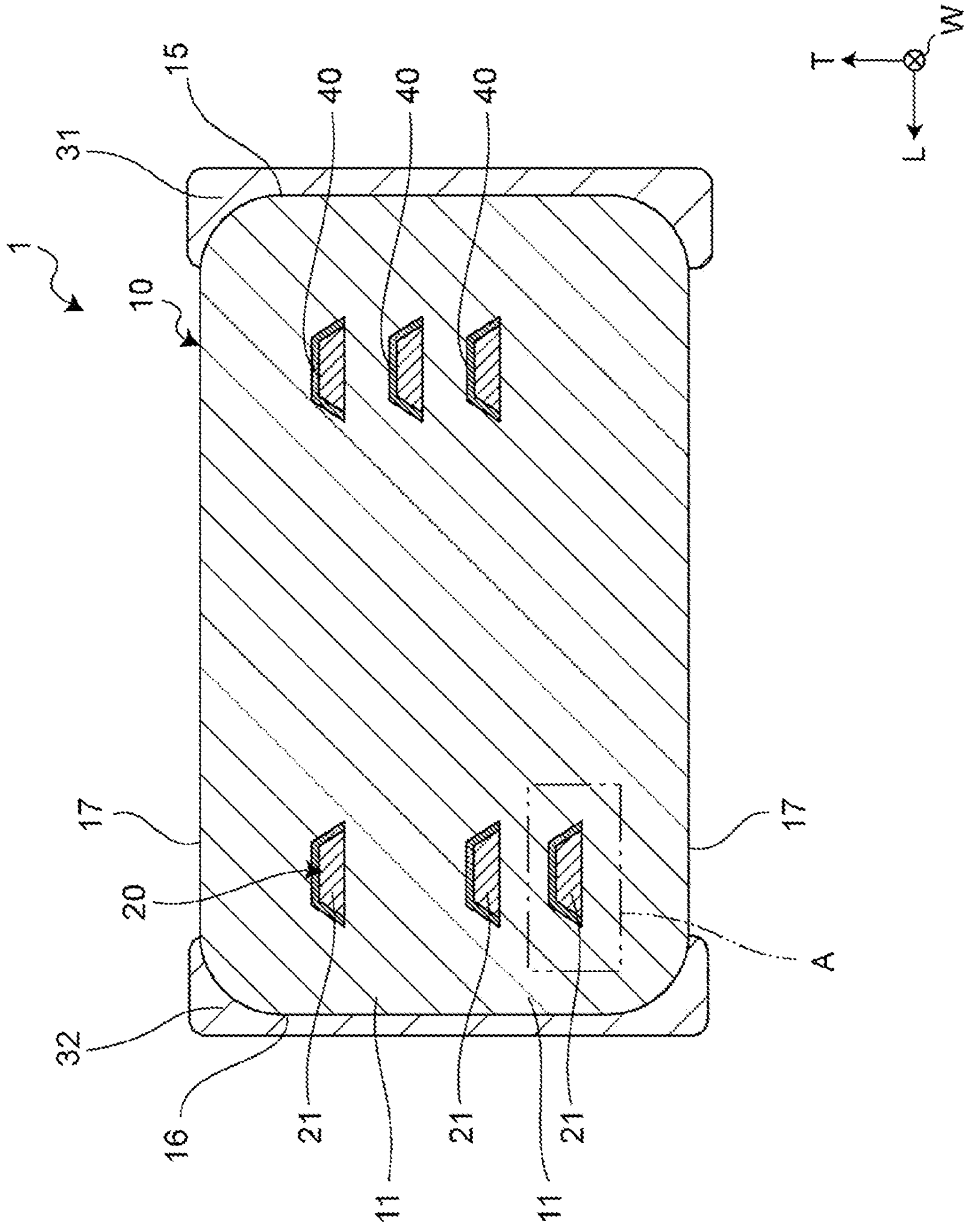
FIG. 2 is an X-X sectional view of FIG. 1.
Figure 3:
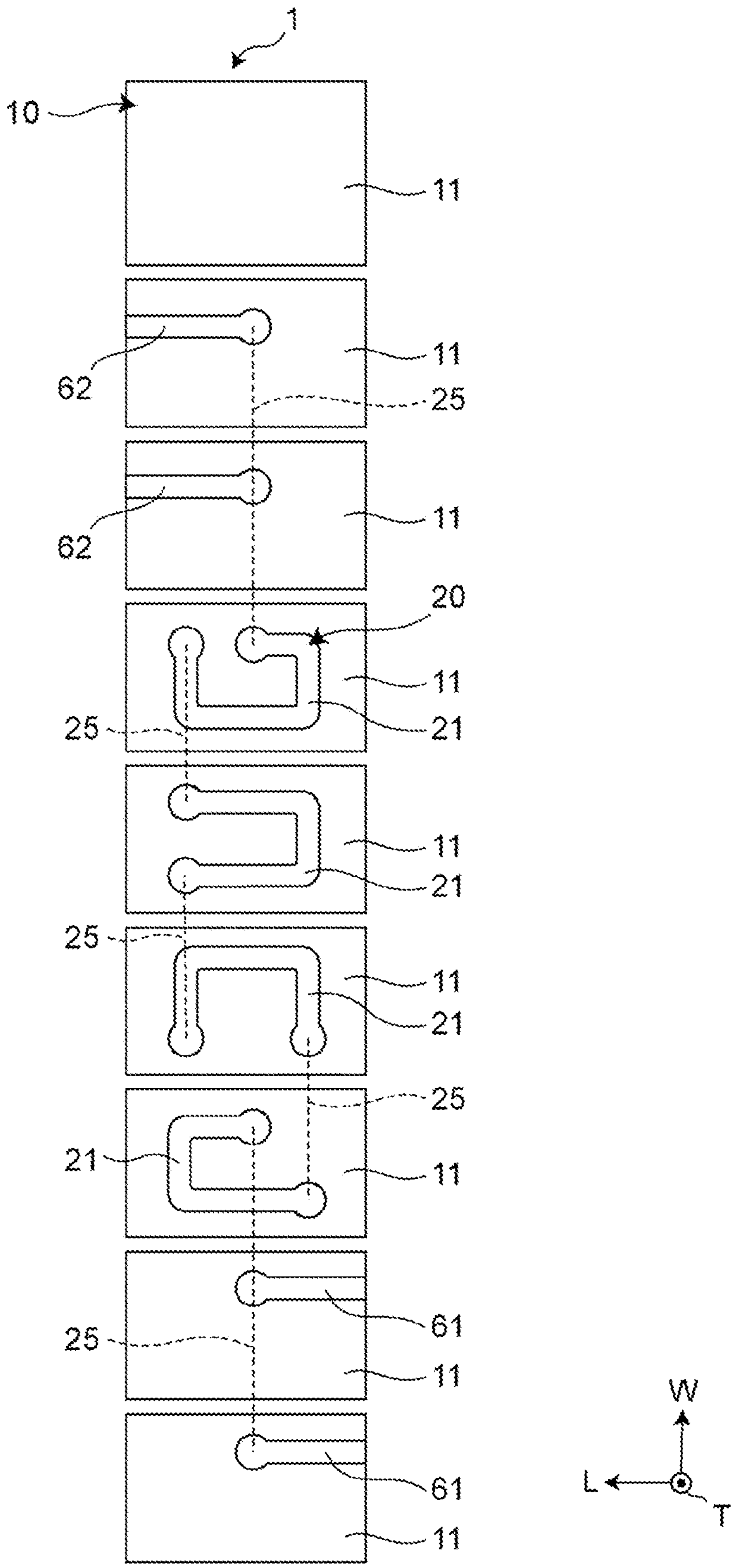
FIG. 3 is an exploded plan view of the coil component.

FIG. 1 is a perspective view illustrating a first exemplary embodiment of a coil component. FIG. 2 is an X-X sectional view of FIG. 1, and is an LT-sectional view passing through a center in a W-direction of the coil component. FIG. 3 is an exploded plan view of the coil component, and illustrates a view along a T-direction from the lower drawing to the upper drawing. Note that an L-direction is a length direction of a coil component 1, the W-direction is a width direction of the coil component 1, and the T-direction is a height direction of the coil component 1. The T-direction is one exemplary embodiment of a "first direction" described in the claims. Hereinafter, a forward direction of the T-direction is referred to as an upper side, and a reverse direction of the T-direction is referred to as a lower side.

As illustrated in FIG. 1, FIG. 2, and FIG. 3, the coil component 1 includes a base body 10, a coil 20 disposed inside the base body 10, and a first external electrode 31 and a second external electrode 32 that are disposed on surfaces of the base body 10, and are electrically connected to the coil 20.

The coil component 1 is electrically connected to wiring of a not-illustrated circuit board via the first external electrode 31 and the second external electrode 32. The coil component 1 is used as, for example, a noise rejection filter, and is used in an electronic device such as a personal computer, a digital versatile disk (DVD) player, a digital camera, a television (TV), a mobile phone, and automotive electronics.

The base body 10 is formed in a substantially rectangular parallelpiped. A surface of the base body 10 includes a first end surface 15, a second end surface 16 located on a side opposite to the first end surface 15, and four side surfaces 17 located between the first end surface 15 and the second end surface 16. The first end surface 15 and the second end surface 16 face each other in the L-direction.

The base body 10 includes a plurality of magnetic layers 11. The plurality of magnetic layers 11 are alternately laminated in the T-direction. Each magnetic layer 11 is formed from, for example, a magnetic material such as a Ni—Cu—Zn base ferrite material. A thickness of each magnetic layer 11 is, for example, in a range of 5 μm to 30 μm, inclusive. Note that the base body 10 may include a non-magnetic layer in part.

The first external electrode 31 covers a whole surface of the first end surface 15 of the base body 10, and an end of the side surface 17 closer to the first end surface 15 of the base body 10. The second external electrode 32 covers a whole surface of the second end surface 16 of the base body 10, and an end of the side surface 17 closer to the second end surface 16 of the base body 10. The first external electrode 31 is electrically connected to a first end of the coil 20, and the second external electrode 32 is electrically connected to a second end of the coil 20. Note that, the first external electrode 31 may have an L shape formed straddling the first end surface 15 and one side surface 17, and the second external electrode 32 may have an L shape formed straddling the second end surface 16 and one side surface 17.

The coil 20 is wound spirally along the T-direction. The coil 20 is formed from, for example, a conductive material such as Ag or Cu. The coil 20 includes a plurality of coil wires 21 and a plurality of pull-out conductor layers 61, 62.

The two first pull-out conductor layers 61, the plurality of coil wires 21, and the two second pull-out conductor layers 62 are laminated in order in the T-direction, and are electrically connected to each other in order via the connecting parts 25. Each connecting part 25 is disposed so as to penetrate the magnetic layer 11 in a laminating direction.

Specifically, the coil wires 21 of four layers are connected in order in the T-direction, and form a spiral along the T-direction. Each coil wire 21 extends along a plane orthogonal to the T-direction. Each coil wire 21 is formed into a shape wound less than one turn. The first pull-out conductor layers 61 expose from the first end surface 15 of the base body 10, and are connected to the first external electrode 31, and the second pull-out conductor layers 62 expose from the second end surface 16 of the base body 10, and are connected to the second external electrode 32.

Each coil wire 21 is configured with one coil conductor layer. A thickness of the coil conductor layer is, for example, in a range of 10 μm to 40 μm, inclusive. Each coil conductor layer is formed such that a conductive paste is printed and dried, for example. Note that, each coil wire 21 may be configured with a plurality of the coil conductor layers. At this time, the plurality of the coil conductor layers are laminated in the T-direction, and the coil conductor layers adjacent to each other in the T-direction are brought into surface contact with each other.

Figure 4:
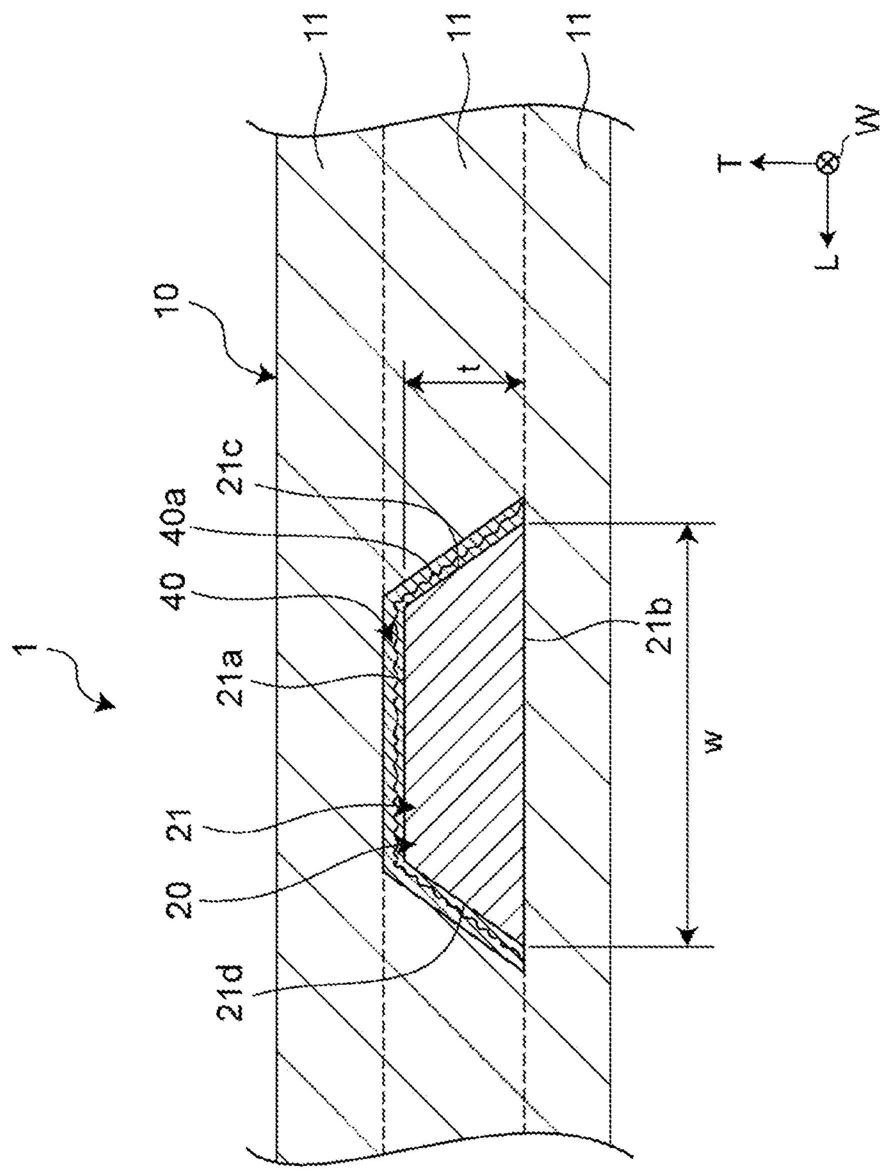
FIG. 4 is an enlarged sectional view of a part A in FIG. 2.

FIG. 4 is an enlarged sectional view of a part A in FIG. 2. That is, FIG. 4 illustrates a section orthogonal to the extending direction of each coil wire 21. As illustrated in FIG. 4, the base body 10 further includes a crack generating layer 40 that overlaps at least a part of the coil wire 21 when viewed from the T-direction. A crack 40*a* is present in the crack generating layer 40.

The crack generating layer 40 is a layer in which the crack 40*a* is easily generated in comparison with the magnetic layer 11. Specifically, the crack generating layer 40 is a layer having low tenacity, and is a layer in which brittle fracture easily occurs. For example, the crack generating layer 40 has lower strength than the magnetic layer 11. The crack generating layer 40 is formed from glass, for example. Preferably, the crack generating layer 40 has magnetic properties.

The crack 40*a* inside the crack generating layer 40 stays inside the crack generating layer 40, and does not continuously extend to the inside of the magnetic layer 11. This crack 40*a* is smaller than the conventional cavity portion, and is the so-called crack.

With this configuration, since the crack 40*a* is present inside the crack generating layer 40, this crack 40*a* can mitigate stress generated between the coil wire 21 and the magnetic layer 11. Further, the coil wire 21 is laminated on the magnetic layer 11 or the crack generating layer 40, and therefore the periphery of the coil wire 21 is not surrounded by the cavity portion as in the conventional technique. This makes a position of the coil wire 21, that is, a position of the coil 20 stable.

Further, the crack 40*a* has substantially no thickness in comparison with the conventional cavity portion, and therefore a good characteristic (a high inductance value or a high impedance value) as the coil component 1 can be obtained. Since the crack 40*a* stays inside the crack generating layer 40, the crack 40*a* does not reach an external surface of the base body 10, resulting excellent weather resistance. Since the crack 40*a* is disposed inside the crack generating layer 40, a position where the crack 40*a* is generated and a size of the crack 40*a* can be controlled, and a shape of the crack 40*a* is made stable. As a result, dispersion in characteristics of the coil component 1 can be reduced.

Note that when the crack generating layer 40 overlaps all of the coil wire 21 when viewed from the T-direction, stress can be further mitigated, but the crack generating layer 40 may overlap at least a part of the coil wire 21 when viewed from the T-direction.

In the coil component 1 of the present disclosure, a crack different from the crack 40*a* may be disposed in the magnetic layer 11 with a purpose other than stress mitigation of the present application. In other words, the crack 40*a* disposed with the purpose of stress mitigation is present inside the crack generating layer 40.

Preferably, the crack generating layer 40 is present between the magnetic layer 11 and the coil wire 21 adjacent to each other in the T-direction. With this configuration, although strong stress is generated at the border region between the magnetic layer 11 and the coil wire 21 adjacent to each other in the T-direction, by disposing the crack generating layer 40 at the border region, this stress can be effectively mitigated.

Preferably, a plurality of crack generating layers 40 are disposed, and each of the plurality of crack generating layers 40 is provided so as to be in contact with each of all coil wires 21. Preferably, the crack 40$a$ is present in each of all crack generating layers 40. This can mitigate stress more.

Note that at least one crack generating layer 40 may be provided so as to be in contact with at least one coil wire 21 among all coil wires 21. The crack 40$a$ may be generated in at least one crack generating layer 40 among all crack generating layers 40. In other words, the crack generating layer 40 without the crack 40$a$ may be present among the plurality of crack generating layers 40.

Preferably, the crack generating layer 40 is further present between the magnetic layer 11 and the coil wire 21 adjacent to each other in a direction orthogonal to the T-direction. This can mitigate stress in the direction orthogonal to the T-direction.

Specifically, in a section orthogonal to the extending direction of the coil wire 21, the coil wire 21 includes two surfaces 21$a$, 21$b$ on both sides in the T-direction, and two side surfaces 21$c$, 21$d$ on both sides in the direction (width direction) orthogonal to the T-direction. In other words, the coil wire 21 includes an upper surface 21$a$ on an upper side in the T-direction, a lower surface 21$b$ on a lower side in the T-direction, an inner side surface 21$c$ on an inner magnetic path side (a central-axis side of the coil 20) of the coil 20 in the width direction, and an outer side surface 21$d$ on an outer magnetic path side (a side gap side of the base body 10) of the coil 20 in the width direction. The upper surface 21$a$ is shorter than the lower surface 21$b$, and a sectional shape of the coil wire 21 is a trapezoid. In the section of the coil wire 21, a thickness t of the coil wire 21 in the T-direction is smaller than a maximum width w of the coil wire 21 in the L-direction.

The crack generating layer 40 is present between the magnetic layer 11 and the upper surface 21$a$ of the coil wire 21, and also present between the magnetic layer 11 and the inner side surface 21$c$ of the coil wire 21, and between the magnetic layer 11 and the outer side surface 21$d$ of the coil wire 21. This can mitigate stress generated between the magnetic layer 11 and the upper surface 21$a$ of the coil wire 21, and can mitigate stress generated between the magnetic layer 11 and the inner side surface 21$c$ of the coil wire 21, and between the magnetic layer 11 and the outer side surface 21$d$ of the coil wire 21.

The sectional shape of the coil wire 21 is not necessarily the rectangle, and may be a polygon other than a quadrangle, an elliptical, or an elliptic. Also in this case, the crack generating layer 40 is present between the magnetic layer 11 and the coil wire 21 adjacent to each other in the T-direction, and also present between the magnetic layer 11 and the coil wire 21 adjacent to each other in the direction orthogonal to the T-direction.

Moreover, the crack generating layer 40 may be disposed so as to be brought into contact with the lower surface 21$b$, the inner side surface 21$c$, and the outer side surface 21$d$, or may be disposed so as to be brought into contact with only the upper surface 21$a$ or the lower surface 21$b$. In other words, the crack generating layer 40 is brought into contact with the upper surface 21$a$ or the lower surface 21$b$. Accordingly, the crack generating layer 40 is brought into contact with the upper surface 21$a$ or the lower surface 21$b$ where an area is larger and stress is more easily generated than the inner side surface 21$c$ and the outer side surface 21$d$, so that stress can be effectively mitigated.

Preferably, an average thickness of the crack generating layer 40 is less than or equal to 10 μm. With this configuration, since the crack generating layer 40 is thin, when the crack generating layer 40 does not have magnetism, a good characteristic (a high inductance value or a high impedance value) as the coil component 1 can be obtained.

Here, the average thickness of the crack generating layer 40 is an average thickness of the crack generating layer 40 in a section orthogonal to the extending direction of the coil wire 21. For example, thicknesses at a plurality of positions in the crack generating layer 40 are measured and the average value is calculated, in the LT section passing through a center of the coil component 1 in the W-direction and the section orthogonal to the extending direction of the coil wire 21.

Preferably, the crack generating layer 40 includes glass having low tenacity. This can reliably generate a crack in the crack generating layer 40. Here, the term "low tenacity" means "the low tenacity indicating low viscosity of a material", "a state of being fragile against external force, in other words, quick development of a crack, low ultimate strength, and low plasticity and low ductility".

Preferably, magnetic permeability of the crack generating layer 40 is larger than 1. With this configuration, a good characteristic (a high inductance value or a high impedance value) as the coil component 1 can be obtained. Preferably, magnetic permeability of the crack generating layer 40 is equal to or lower than magnetic permeability of the magnetic layer. With this configuration, a desired characteristic as the coil component 1 can be obtained.

Next, a manufacturing method of the coil component 1 will be described with reference to FIG. 5A to FIG. 5F. Each of FIG. 5A to FIG. 5F illustrates the LT section orthogonal to the extending direction of the coil wire 21.

First, a green magnetic layer, a green crack generating layer, and a green coil wire are prepared. This step is referred to as a preparation step. The green magnetic layer is formed from a magnetic paste. The green coil wire is formed from a conductive paste. The green crack generating layer is formed from a conductive paste including glass. Note that the green crack generating layer may be formed from glass without including the conductive paste, but the green crack generating layer including the conductive paste can be formed to be uniform and thin.

Next, the green magnetic layer, the green crack generating layer, and the green coil wire are laminated in the T-direction, and the green crack generating layer is caused to overlap at least a part of the green coil wire when viewed from the T-direction. This step is referred to a lamination step.

Figure 5A:
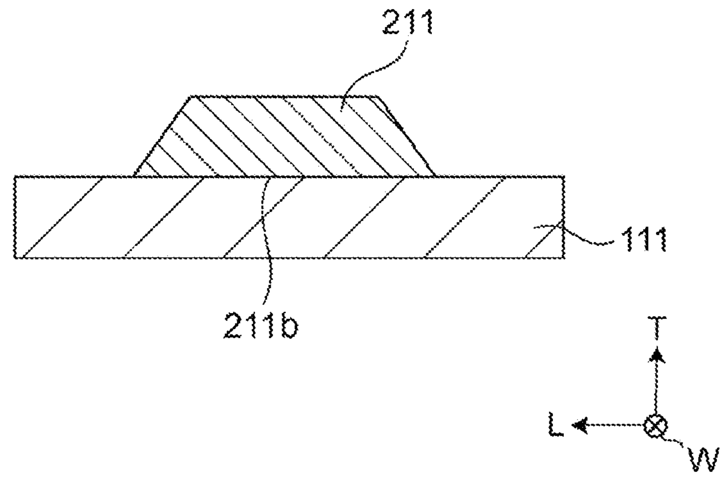
FIG. 5A is a sectional view illustrating an example of a manufacturing method of the coil component.

Specifically, as illustrated in FIG. 5A, a green coil wire 211 is laminated on a first green magnetic layer 111. A lower surface 211$b$ of the green coil wire 211 is brought into contact with the first green magnetic layer 111.

Figure 5B:
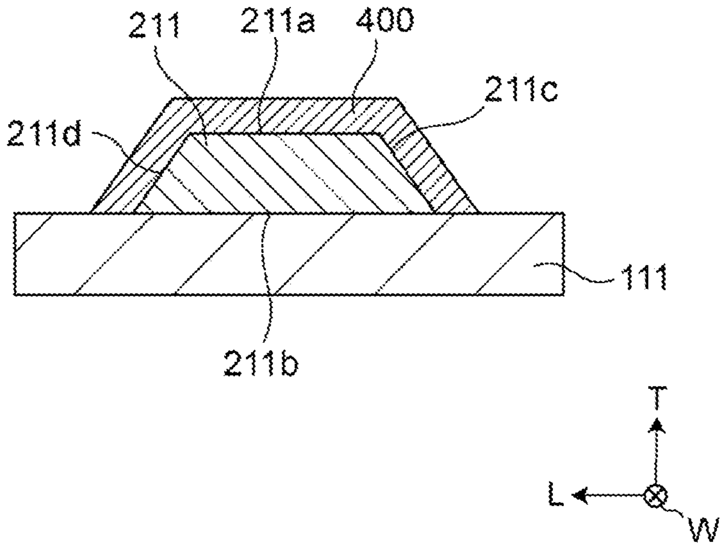
FIG. 5B is a sectional view illustrating an example of the manufacturing method of the coil component.

As illustrated in FIG. 5B, a green crack generating layer 400 is disposed on an upper surface 211$a$, an inner side surface 211$c$, and an outer side surface 211$d$ of the green coil wire 211.

Figure 5C:
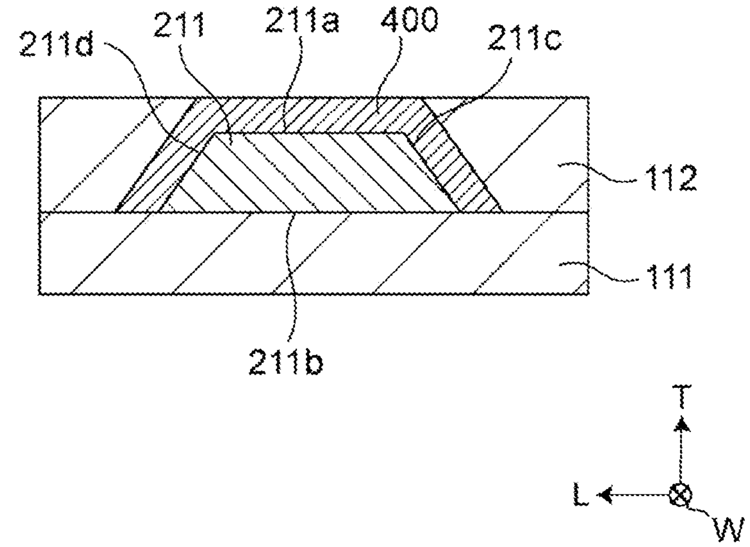
FIG. 5C is a sectional view illustrating an example of the manufacturing method of the coil component.

As illustrated in FIG. 5C, a second green magnetic layer 112 is laminated on the first green magnetic layer 111, to expose a portion of the green crack generating layer 400 facing the upper surface 211$a$ of the green coil wire 211, and to cover portions of the green crack generating layer 400 facing the inner side surface 211$c$ and the outer side surface 211$d$ of the green coil wire 211.

Figure 5D:
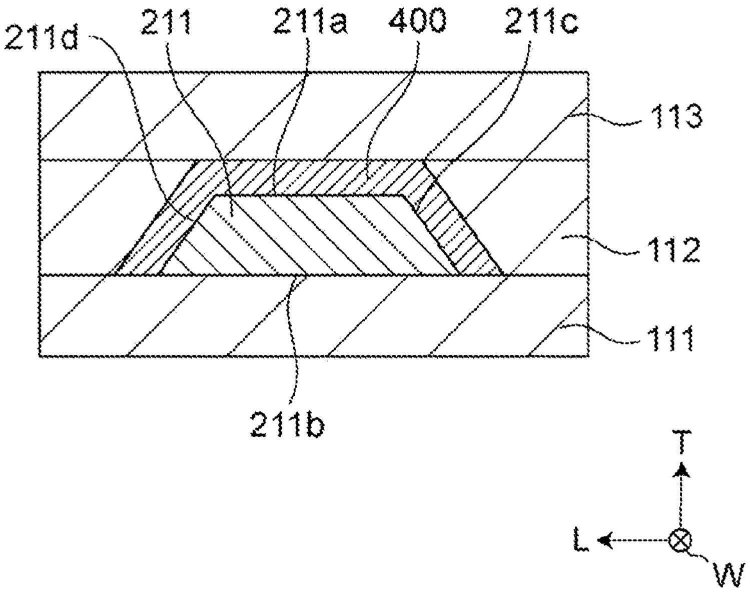
FIG. 5D is a sectional view illustrating an example of the manufacturing method of the coil component.

As illustrated in FIG. 5D, a third green magnetic layer 113 is laminated on the second green magnetic layer 112, to cover the portion of the green crack generating layer 400 facing the upper surface 211$a$ of the green coil wire 211. The above-described lamination steps are repeated a plurality of times to form a laminate.

Figure 5E:
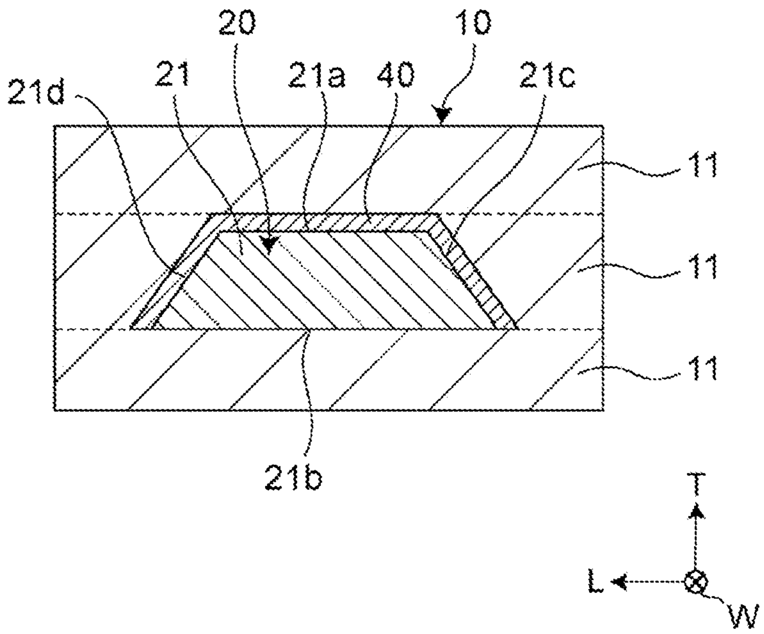
FIG. 5E is a sectional view illustrating an example of the manufacturing method of the coil component.

Subsequently, as illustrated in FIG. 5E, the green magnetic layers 111 to 113, the green crack generating layer 400, and the green coil wire 211, that is, the laminate is fired, thereby obtaining the base body 10 including a magnetic layer 11 and a crack generating layer 40, and the coil 20 disposed inside the base body 10 and including the coil wire 21. The crack generating layer 40 overlaps at least a part of the coil wire 21 when viewed from the T-direction. This step is referred to as a firing step.

In the firing step, the green magnetic layers 111 to 113 are fired to form the magnetic layers 11. The conductive paste that is a part of the green crack generating layer 400 is fired together with the green coil wire 211 to form the coil wire 21. The glass that is a part of the green crack generating layer 400 is fired to form the crack generating layer 40.

Figure 5F:
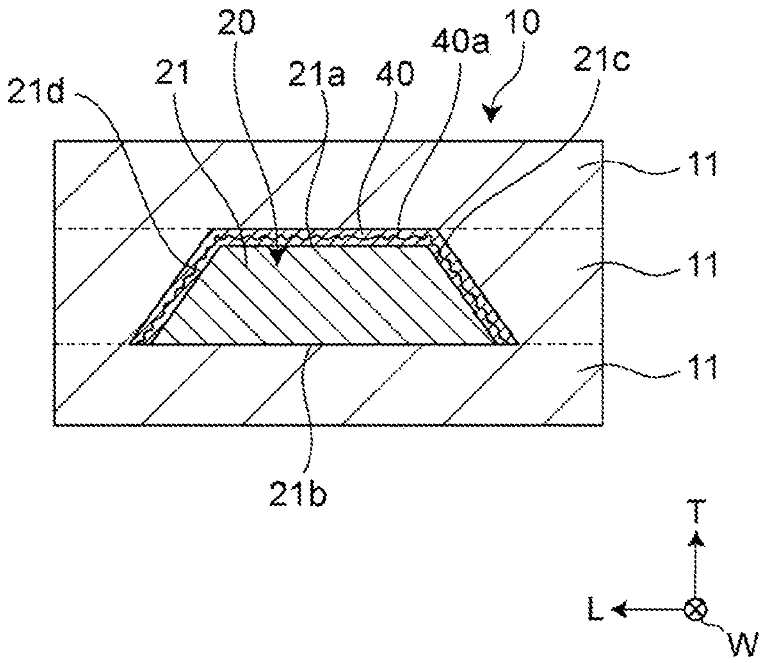
FIG. 5F is a sectional view illustrating an example of the manufacturing method of the coil component.

Subsequently, as illustrated in FIG. 5F, the crack 40*a* is generated inside the crack generating layer 40. This step is referred to as a crack generating step. Thus the coil component 1 illustrated in FIG. 2 is manufactured.

As described above, since the crack 40*a* is generated inside the crack generating layer 40, stress generated between the coil wire 21 and the magnetic layer 11 can be mitigated. Since the coil wire 21 is laminated on the magnetic layer 11 or the crack generating layer 40, positions of the coil wires 21, that is, a position of the coil 20 can be made stable.

Preferably, the crack generating step is a step of performing, on the base body 10, thermal shock processing having a difference in temperature of 120° C. or more, one or more times. This can reliably generate the crack 40*a* inside the crack generating layer 40. Preferably, the thermal shock processing is processing in which the base body 10 is immersed in liquid nitrogen one or more times. This can generate the crack 40*a* inside the crack generating layer 40 with a simple method that is immersion.

Note that, without providing the crack generating step, the crack 40*a* may be generated inside the crack generating layer 40 in the firing step. Specifically, the firing step further includes a step in which when a firing temperature reaches 300° C., the thermal shock processing of atmosphere releasing (furnace opening) is performed to generate the crack 40*a* inside the crack generating layer 40. This can eliminate additional facilities or steps when the crack 40*a* is formed, in comparison with a case of provision of the crack generating step.

Second Exemplary Embodiment

Figure 6:
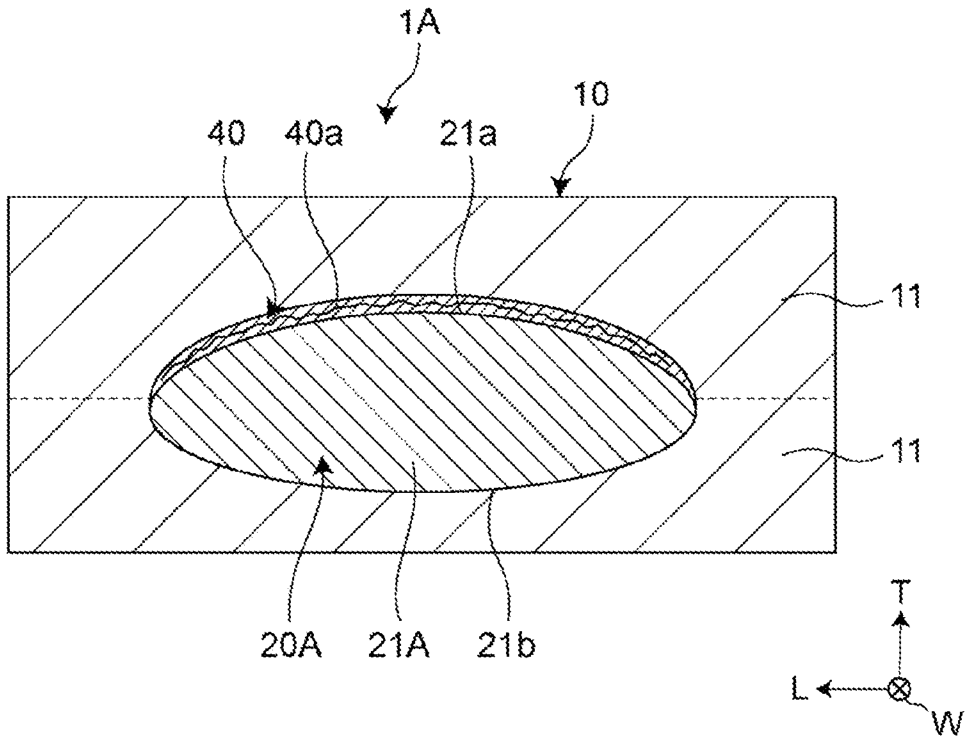
FIG. 6 is a sectional view illustrating a second exemplary embodiment of a coil component of the present disclosure.

FIG. 6 is a sectional view illustrating a second exemplary embodiment of the coil component of the present disclosure. The second exemplary embodiment is different from the first exemplary embodiment in a shape of the coil wire. These different configurations will be described below. Other configurations are the same as those in the first exemplary embodiment, and description thereof is omitted.

As illustrated in FIG. 6, in a coil component 1A of the second exemplary embodiment, a shape of a coil wire 21A of a coil 20A is an elliptic in a section orthogonal to an extending direction of the coil wire 21A. The coil wire 21A includes an upper surface 21*a* in an arc shape and a lower surface 21*b* in an arc shape.

The coil wire 21A is interposed between two magnetic layers 11. Specifically, the lower surface 21*b* of the coil wire 21A is brought into contact with the magnetic layer 11 on the lower side. A crack generating layer 40 is present between the upper surface 21*a* of the coil wire 21A and the magnetic layer 11 on the upper side. In other words, the crack generating layer 40 is brought into contact with the upper surface 21*a* of the coil wire 21A.

The crack generating layer 40 is present between the magnetic layer 11 and the coil wire 21A adjacent to each other in the T-direction. The crack generating layer 40 is also present between the magnetic layer 11 and the coil wire 21A adjacent to each other in the L-direction orthogonal to the T-direction.

Next, a manufacturing method of the coil component 1A will be described.

Figure 7:
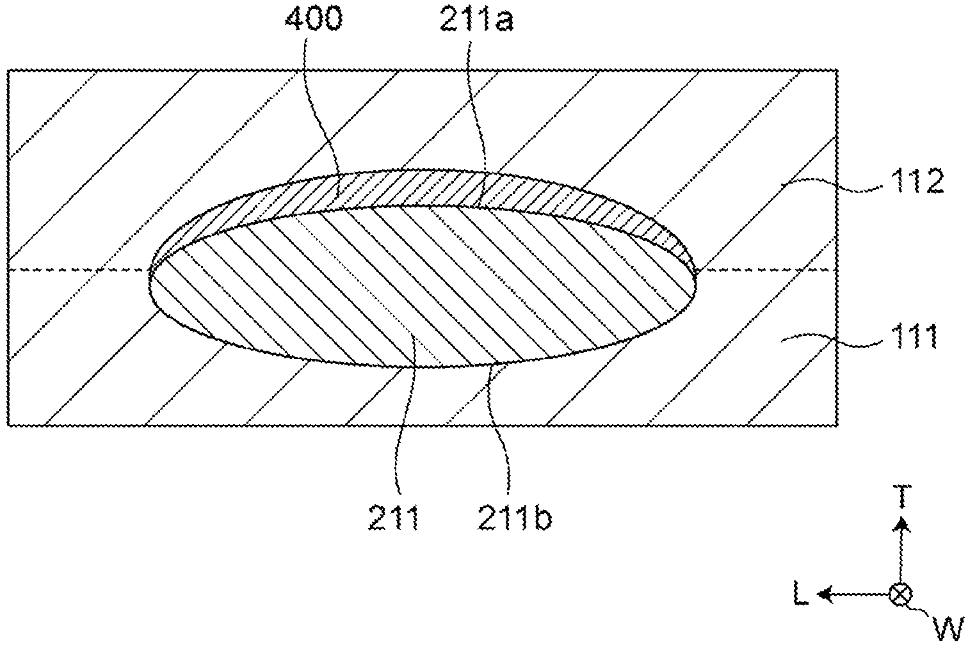
FIG. 7 is a sectional view illustrating an example of a manufacturing method of the coil component.

As illustrated in FIG. 7, a first green magnetic layer 111, a green coil wire 211, a green crack generating layer 400, and a second green magnetic layer 112 are sequentially laminated along the T-direction. At this time, a lower surface 211*b* of the green coil wire 211 is brought into contact with the first green magnetic layer 111, and an upper surface 211*a* of the green coil wire 211 is brought into contact with the green crack generating layer 400. The green magnetic layer is formed from a magnetic sheet, which is different from the first exemplary embodiment.

Thereafter, through the firing step and the crack generating step of the first exemplary embodiment, as illustrated in FIG. 6, a crack 40*a* is generated inside the crack generating layer 40, thereby manufacturing the coil component 1A.

The coil component 1A of the second exemplary embodiment has similar effects to the coil component 1 of the first exemplary embodiment.

Third Exemplary Embodiment

Figure 8:
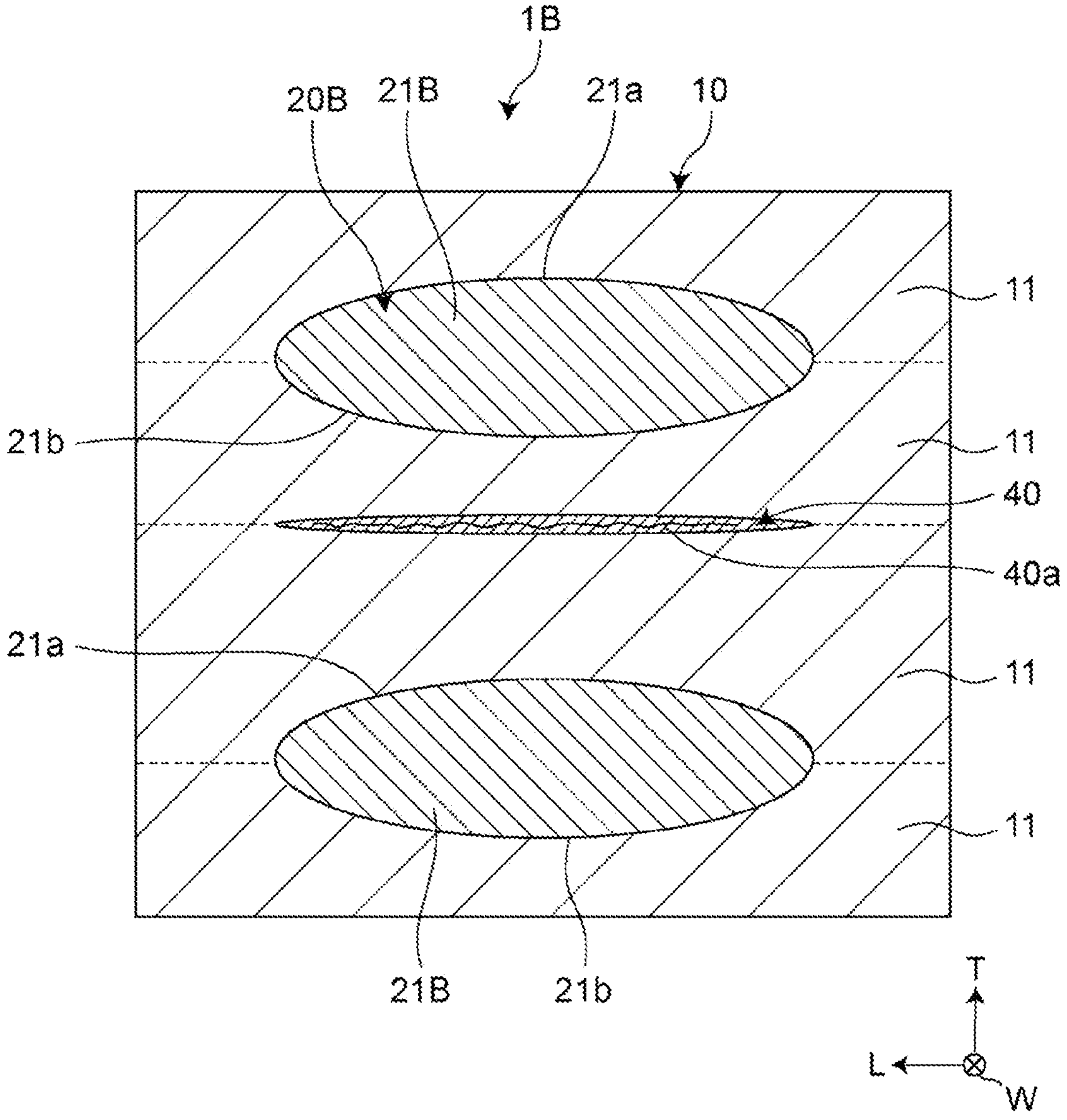
FIG. 8 is a sectional view illustrating a third exemplary embodiment of a coil component of the present disclosure.

FIG. 8 is a sectional view illustrating a third exemplary embodiment of the coil component of the present disclosure. The third exemplary embodiment is different from the first exemplary embodiment in a shape of the coil wire and a position of the crack generating layer. These different configurations will be described below. Other configurations are the same as those in the first exemplary embodiment, and description thereof is omitted.

As illustrated in FIG. 8, in a coil component 1B of the third exemplary embodiment, a shape of a coil wire 21B of a coil 20B is an elliptic in a section orthogonal to an extending direction of the coil wire 21B. The coil wire 21B includes an upper surface 21*a* in an arc shape and a lower surface 21*b* in an arc shape.

The coil wire 21B is interposed between two magnetic layers 11. Specifically, the lower surface 21*b* of the coil wire 21B is brought into contact with the magnetic layer 11 on the lower side. The upper surface 21*a* of the coil wire 21B is brought into contact with the magnetic layer 11 on the upper side.

The crack generating layer 40 is present between two coil wires 21B adjacent to each other in the T-direction. With this configuration, stress generated between two coil wires 21B adjacent to each other in the T-direction can be effectively mitigated.

Specifically, the crack generating layer 40 is present between two magnetic layers 11 adjacent to each other in the T-direction. In other words, the crack generating layer 40 is not brought into contact with the coil wire 21B. With this configuration, the crack generating layer 40 can easily be disposed in comparison with a case where the crack generating layer 40 is directly disposed to the coil wire 21B.

In a section orthogonal to the extending direction of the coil wire 21B, with respect to a width in an L-direction orthogonal to the T-direction, the width of the crack generating layer 40 is the same as the width of the coil wire 21B. Note that the width of the crack generating layer 40 may be wider than the width of the coil wire 21B. In this case, stress can be mitigated more by the crack 40*a* inside the crack generating layer 40. On the other hand, the width of the crack generating layer 40 may be narrower than the width of the coil wire 21B. In this case, the crack generating layer 40 does not extend to the outer magnetic path or the inner magnetic path of the base body 10, and the crack generating layer 40 does not interfere with a magnetic flux of the coil 20B.

Next, a manufacturing method of the coil component 1B will be described.

Figure 9:
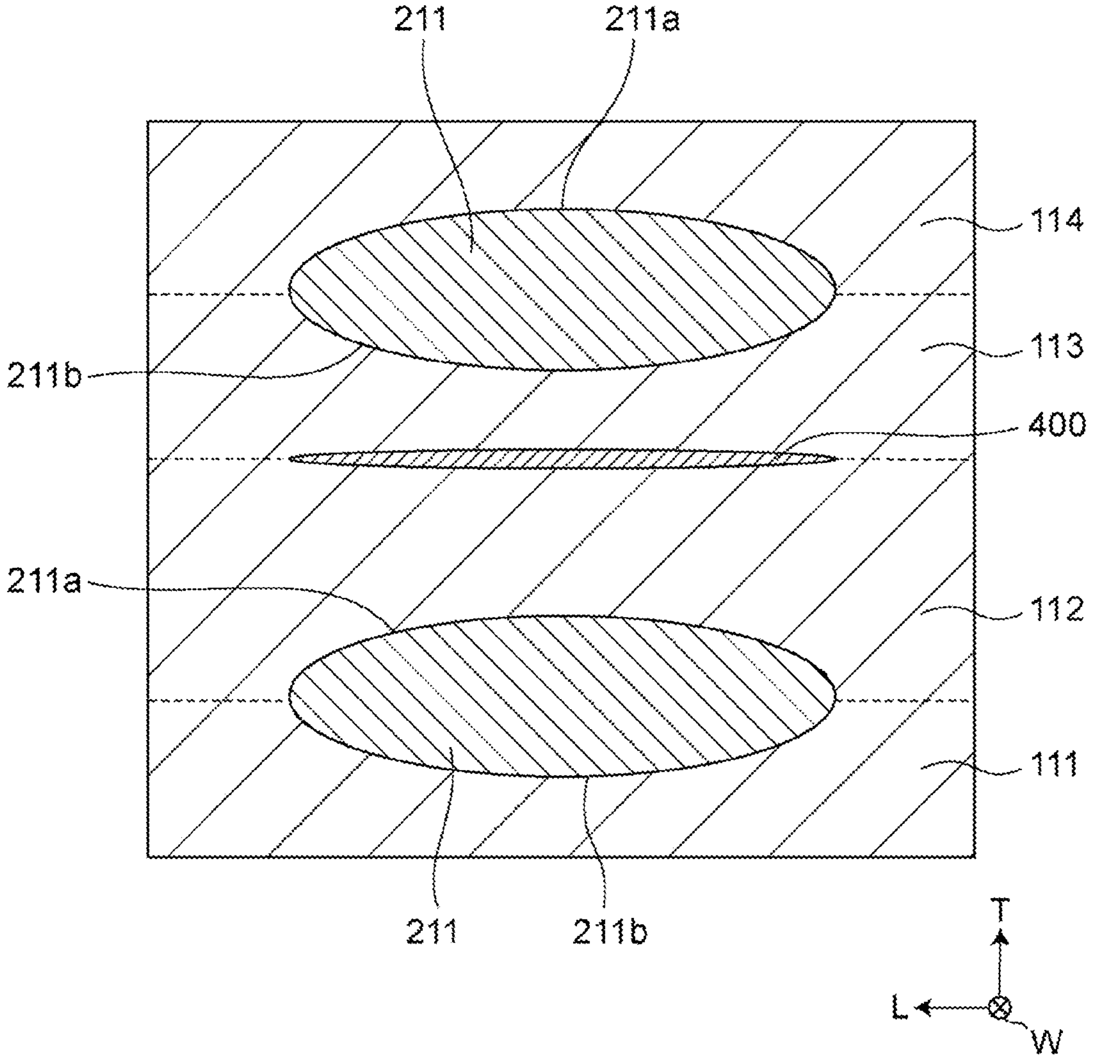
FIG. 9 is a sectional view illustrating an example of a manufacturing method of the coil component.

As illustrated in FIG. 9, a first green magnetic layer 111, a first green coil wire 211, a second green magnetic layer 112, a green crack generating layer 400, a third green magnetic layer 113, a second green coil wire 211, and a fourth green magnetic layer 114 are sequentially laminated along the T-direction. At this time, a lower surface 211*b* of the first green coil wire 211 is brought into contact with the first green magnetic layer 111, and an upper surface 211*a* of the first green coil wire 211 is brought into contact with the second green magnetic layer 112. Further, a lower surface 211*b* of the second green coil wire 211 is brought into contact with the third green magnetic layer 113, and an upper surface 211*a* of the second green coil wire 211 is brought into contact with the fourth green magnetic layer 114. The green crack generating layer 400 is present at a part between the second green magnetic layer 112 and the third green magnetic layer 113. The green magnetic layer is formed from a magnetic sheet, which is different from the first exemplary embodiment.

Thereafter, through the firing step and the crack generating step of the first exemplary embodiment, as illustrated in FIG. 8, a crack 40*a* is generated inside the crack generating layer 40, thereby manufacturing the coil component 1B.

The coil component 1B of the third exemplary embodiment has similar effects to the coil component 1 of the first exemplary embodiment.

Note that the present disclosure is not limited to the above exemplary embodiments, and can be changed in design within a range not departing from the gist of the present disclosure. For example, feature points of the first to third exemplary embodiments may be variously combined. An increase or decrease in the number of the coil wires or the number of the crack generating layers can be changed in design.

What is claimed is:

1. A coil component comprising:

a base body including a plurality of magnetic layers laminated in a first direction; and a coil, disposed in the base body, and including a plurality of coil wires laminated in the first direction, the base body further including a crack generating layer that overlaps at least a portion of the coil wires when viewed in the first direction, and a crack present inside the crack generating layer, wherein the crack generating layer includes glass.

2. The coil component according to claim 1, wherein the crack generating layer is present between each of the magnetic layers and each of the coil wires adjacent to each other in the first direction.

3. The coil component according to claim 1, wherein the crack generating layer is present between two of the coil wires adjacent to each other in the first direction.

4. The coil component according to claim 3, wherein the crack generating layer is present between two of the magnetic layers adjacent to each other in the first direction.

5. The coil component according to claim 1, wherein the crack generating layer is present between each of the magnetic layers and each of the coil wires adjacent to each other in a direction orthogonal to the first direction.

6. The coil component according to claim 5, wherein the coil wires extend along a plane orthogonal to the first direction, each of the coil wires includes two side surfaces on both sides in a direction orthogonal to the first direction, in a cross-section orthogonal to an extending direction of the coil wires, and the crack generating layer is present between each of the magnetic layers and the side surfaces of each of the coil wires.

7. The coil component according to claim 1, wherein an average thickness of the crack generating layer is less than or equal to 10 μm.

8. The coil component according to claim 1, wherein the glass has low tenacity.

9. The coil component according to claim 1, wherein magnetic permeability of the crack generating layer is greater than 1.

10. The coil component according to claim 9, wherein the magnetic permeability of the crack generating layer is equal to or less than magnetic permeability of the magnetic layers.

11. The coil component according to claim 2, wherein the crack generating layer is present between each of the magnetic layers and each of the coil wires adjacent to each other in a direction orthogonal to the first direction.

12. The coil component according to claim 3, wherein the crack generating layer is present between each of the magnetic layers and each of the coil wires adjacent to each other in a direction orthogonal to the first direction.

13. The coil component according to claim 2, wherein an average thickness of the crack generating layer is less than or equal to 10 μm.

14. The coil component according to claim 3, wherein an average thickness of the crack generating layer is less than or equal to 10 μm.

15. The coil component according to claim 2, wherein the glass has low tenacity.

16. The coil component according to claim 2, wherein magnetic permeability of the crack generating layer is greater than 1.

* * * * *